(12) United States Patent
Kaiserman et al.

(10) Patent No.: US 11,439,162 B2
(45) Date of Patent: Sep. 13, 2022

(54) DISSOLVABLE COMPOSITION HAVING INDICIA

(71) Applicant: Vitiprints, LLC, New York, NY (US)

(72) Inventors: Terrance Kaiserman, Loxahatchee, FL (US); Andrew Ferber, New York, NY (US)

(73) Assignee: Vitiprints, LLC, New York, NY (US)

( * ) Notice: Subject to any disclaimer, the term of this patent is extended or adjusted under 35 U.S.C. 154(b) by 244 days.

(21) Appl. No.: 16/598,375

(22) Filed: Oct. 10, 2019

(65) Prior Publication Data

US 2020/0113210 A1 Apr. 16, 2020

Related U.S. Application Data

(60) Provisional application No. 62/744,299, filed on Oct. 11, 2018.

(51) Int. Cl.
*A23L 2/52* (2006.01)
*A23L 33/155* (2016.01)
*A23L 33/135* (2016.01)
*A23L 29/00* (2016.01)

(52) U.S. Cl.
CPC .............. *A23L 2/52* (2013.01); *A23L 29/035* (2016.08); *A23L 33/135* (2016.08); *A23L 33/155* (2016.08)

(58) Field of Classification Search
CPC ........ A23L 2/52; A23L 29/035; A23L 33/135; A23L 33/155
USPC .... 426/426, 590, 87, 89, 104, 291, 289, 292
See application file for complete search history.

(56) References Cited

U.S. PATENT DOCUMENTS

| | | | |
|---|---|---|---|
| 3,533,804 A * | 10/1970 | Bennett | |
| 5,643,667 A | 7/1997 | Tsukioka | |
| 5,862,101 A | 1/1999 | Haas et al. | |
| 5,957,458 A | 9/1999 | Haas et al. | |
| 2008/0073239 A1 | 3/2008 | Duffield et al. | |
| 2010/0189842 A1* | 7/2010 | Toren | |
| 2011/0290694 A1 | 12/2011 | Fuisz et al. | |
| 2013/0266520 A1 | 10/2013 | Fuisz et al. | |
| 2015/0297654 A1 | 10/2015 | Speier | |
| 2016/0128348 A1* | 5/2016 | Massey | A23F 5/125 426/89 |
| 2017/0290768 A1 | 10/2017 | Barzilay et al. | |
| 2019/0269625 A1* | 9/2019 | Kaiserman | A61K 9/2086 |

FOREIGN PATENT DOCUMENTS

| | | |
|---|---|---|
| CN | 1409682 A | 4/2003 |
| CN | 103025299 A | 4/2013 |
| JP | 2016518830 A * | 6/2016 |

(Continued)

OTHER PUBLICATIONS

Dailymed—Meclizine hydrochloride tablet, pp. 1-3, https://dailymed.nlm.nih.gov/dailymed/drugInfo.cfm?setid , 2015. (Year: 2015) (Year: 2015).*

(Continued)

*Primary Examiner* — Helen F Heggestad
(74) *Attorney, Agent, or Firm* — Lerner, David, Littenberg, Krumholz & Mentlik, LLP

(57) ABSTRACT

The invention is directed to compositions and methods for preparing dissolvable compositions. The dissolvable compositions include a plurality of dissolvable layers, where the dissolvable layers convey a message when associated with a solvent.

12 Claims, 7 Drawing Sheets

(56) References Cited

FOREIGN PATENT DOCUMENTS

WO            0170591 A1     9/2001
WO       WO16046817    *   3/2016

OTHER PUBLICATIONS

Medical Marijuana Evaluations: pp. 1-7, https://prestodoctor.com/content/medical-marijuana/healthiest-methods-of-medical-marijuana . . . , Jan. 19, 2018. (Year: 2018) (Year: 2018).*
DailyMed—Meclizine Hydrochloride tablet, https://dailymed.nlm.nih.gov/dailymed/drugInfo.cfm?setid. pp. 1-3. (Year: 2022).*
International Search Report including Written Opinion for Application No. PCT/US2019/55618, dated Jan. 6, 2020, pp. 1-16.

* cited by examiner

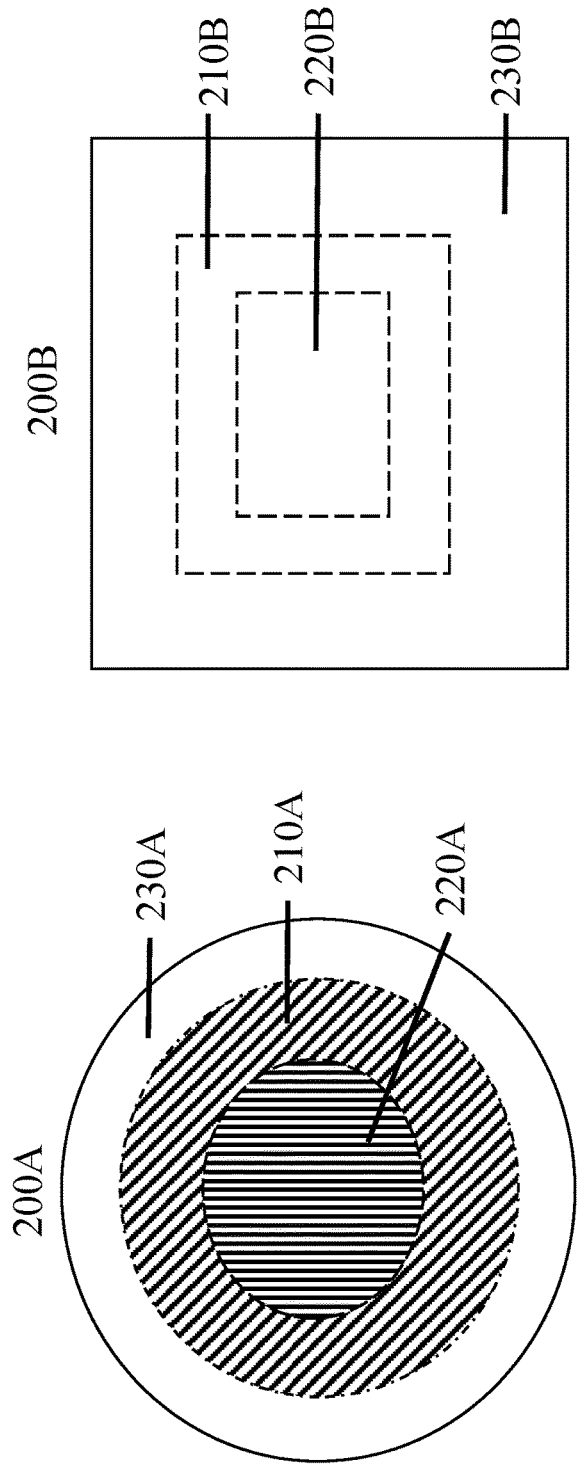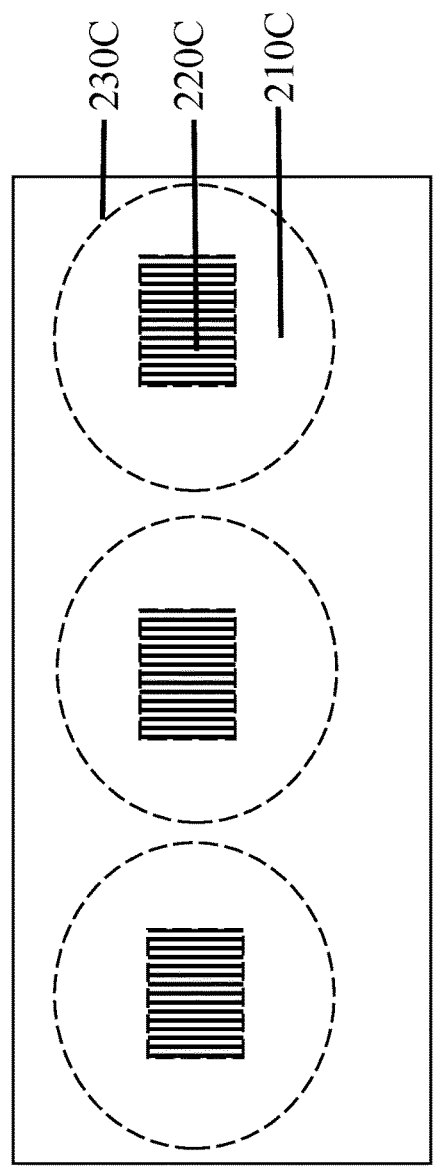

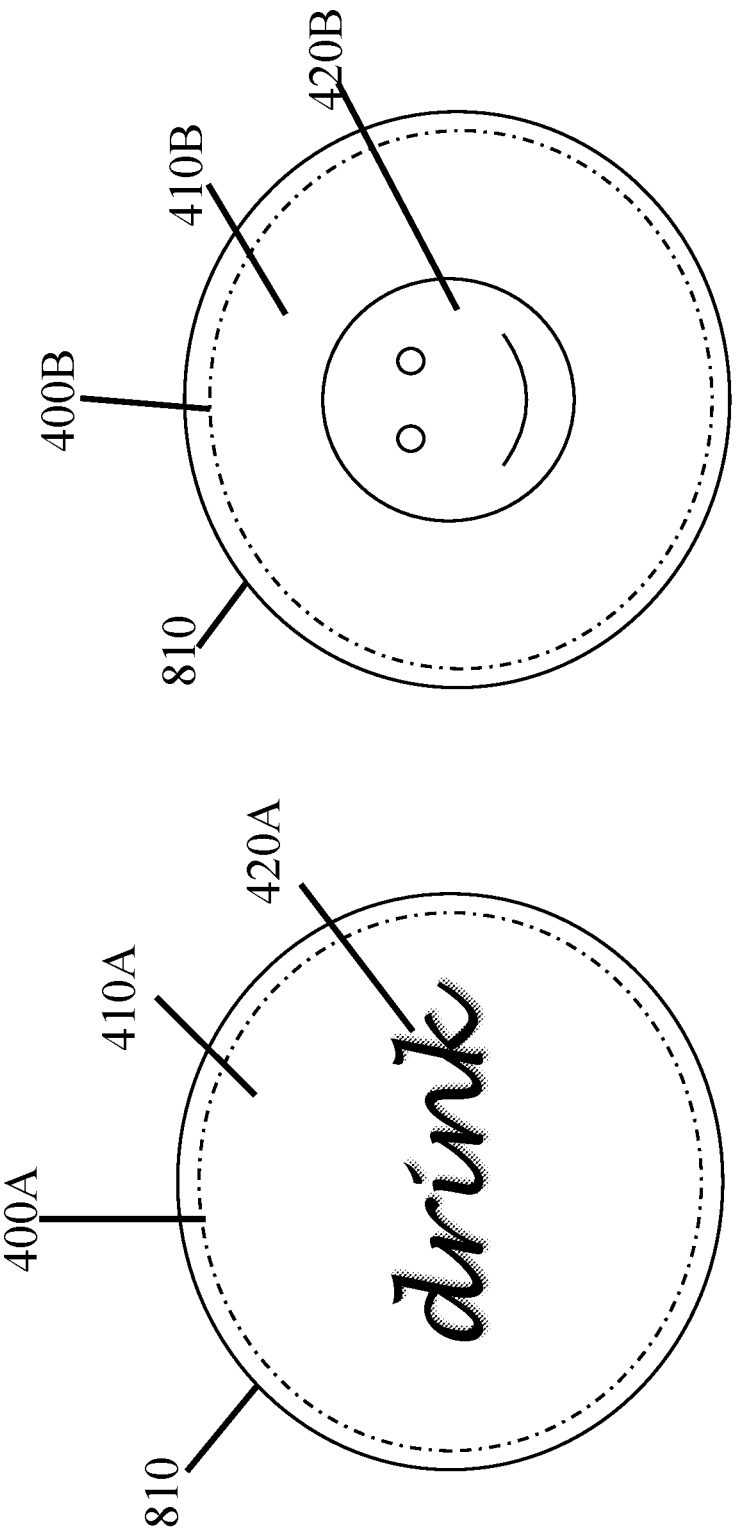

DISSOLVABLE COMPOSITION HAVING INDICIA

CROSS REFERENCE TO RELATED APPLICATION

This application claims the benefit of the filing date of U.S. Provisional Patent Application No. 62/744,299 filed Oct. 11, 2018, the disclosure of which is incorporated herein by reference.

FIELD OF THE INVENTION

This invention relates to a dissolvable composition that includes a plurality of layers, where the layers have different dissolution profiles and at least one of the layers includes indicia.

BACKGROUND OF THE INVENTION

A need exists for providing a dissolvable composition that includes indicia that may convey a message when the dissolvable composition is associated with a solvent.

BRIEF SUMMARY OF THE INVENTION

The technology is related to a dissolvable composition. The composition includes a first layer and a second layer, where the second layer includes indicia. In one aspect, the first layer and the second layer have different dissolution profiles.

In one aspect, a dissolvable composition is provided that includes a first layer having a first dissolution rate; and an indicia layer having a second dissolution rate, where the indicia layer is associated with the first layer.

In one aspect, the dissolvable composition has a dissolution rate of 0 seconds to about 12 hours when associated with a composition having a temperature of about 0° F.-220° F. In some embodiments, the first layer of the dissolvable composition may have a dissolution rate of 1 second to about 30 minutes and the second layer has a dissolution rate of 30 seconds to about 12 hours when the solvent has a temperature of about 0° F.-220° F. In another aspect, the first printed layer has a dissolution rate of 30 seconds to about 12 hours when the solvent has a temperature selected from: 0° F.-220° F. and the second layer has a dissolution rate of 1 second to about 30 minutes when the solvent has a temperature selected from: 0° F.-220° F.

In some aspects, the first layer dissolves faster than the indicia layer. In other aspects, the indicia layer dissolves faster than the first layer.

In some embodiments, the first layer has a dissolution rate selected from: 0-60 seconds. In some embodiments, the second layer has a dissolution rate of 0-60 seconds.

In some embodiments, the first layer has a dissolution rate of 0-30 and the second layer has a dissolution rate of 31-60 seconds. In other embodiments, the first layer has a dissolution rate of 31-60 seconds and the second layer has a dissolution rate of 0-30. In some aspects, the dissolvable composition comprises an active ingredient. In some aspects, the active is selected from: vitamins, minerals, proteins, probiotics, fibers, amino acids, dietary supplements, pharmaceutical ingredients, nutritional supplements, flavors, fragrances, colorants, and combinations thereof. In some embodiments, the dissolvable composition includes a cannabis product such as tetrahydrocarnnabinol (THC), cannabidiol (CBD), other cannabinoids, and the like, and combinations thereof.

In one embodiment, the dissolvable composition comprises a probiotic. In one embodiment, the dissolvable composition comprises Vitamin D.

In one aspect, a dissolvable printed composition is provided that includes a first printed layer having a first dissolution rate; and a second printed layer that includes indicia and has a first dissolution rate, where the first printed layer is associated with the second printed layer.

In some embodiments, the first printed layer dissolves faster than the second printed layer. In other embodiments, the second printed layer dissolves faster than the first layer.

In some embodiments, the dissolvable composition has a dissolution rate of 0 seconds to about 12 hours when the solvent has a temperature in the range of 0° F.-220° F. In some aspects, the first printed layer has a dissolution rate of 0 seconds to about 12 hours when the solvent has a temperature in the range of 0° F.-220° F. In other aspects, the second printed layer has a dissolution rate 0 seconds to about 12 hours when the solvent has a temperature in the range of 0° F.-220° F.

In one aspect, the first layer has a dissolution rate of 0-30 seconds when the solvent has a temperature selected from: 30° F.-50° F., 60° F.-85° F., and 160° F.-200° F. and the second layer has a dissolution rate of 31-60 seconds when the solvent has a temperature selected from: 30° F.-50° F., 60° F.-85° F., and 160° F.-200° F. In another aspect, the first printed layer has a dissolution rate of 31-60 seconds when the solvent has a temperature selected from: 30° F.-50° F., 60° F.-85° F., and 160° F.-200° F. and the second layer has a dissolution rate of 0-30 seconds when the solvent has a temperature selected from: 30° F.-50° F., 60° F.-85° F., and 160° F.-200° F.

In one embodiment, a dissolvable composition that includes regions of varying thickness, where the dissolvable composition is capable of displaying indicia when associated with a solvent is provided.

In one embodiment, a method for preparing a dissolvable composition capable of displaying indicia in a solvent is provided that includes providing a first dissolvable layer; associating a second dissolvable layer to the first dissolvable layer, where the second dissolvable layer includes indicia.

In some embodiments, the first dissolvable layer dissolves at a faster rate when exposed to a solvent than the second dissolvable layer. In some embodiments, the first dissolvable layer dissolves at a slower rate when exposed to a solvent than the second dissolvable layer.

In some embodiments, the first dissolvable layer and second dissolvable layers are printed.

BRIEF DESCRIPTION OF THE DRAWINGS

FIGS. 2A, 2B, and 2C depict a schematic view of a dissolvable composition and substrate in accordance with some embodiments of the present invention.

FIGS. 4A and 4B depict a schematic view of a solvent including a dissolvable composition in accordance with some embodiments of the present invention.

DETAILED DESCRIPTION

Figure 1:
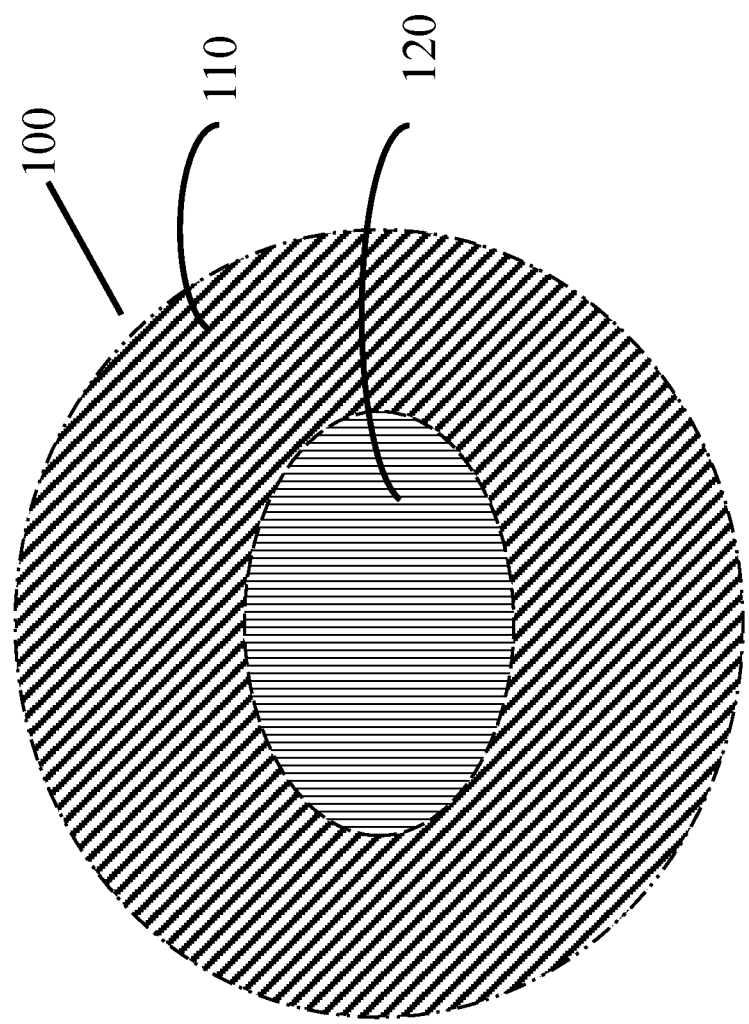
FIG. 1 depicts a schematic view of a dissolvable composition in accordance with some embodiments of the present application.

The invention relates to dissolvable compositions that include at least two dissolvable layers and methods of making the same. See FIG. 1. Dissolvable composition 100 of the present invention includes first dissolvable layer 110 and second dissolvable layer 120 where the dissolution profiles of the individual layers are different.

Each layer may include active or inactive ingredients. In this regard, the printed composition may be comprised of active ingredients, such as one or more supplements. For instance, the active may be selected from: vitamins, minerals, proteins, probiotics, fibers, amino acids, dietary supplements, pharmaceutical ingredients, nutritional supplements, flavors, fragrances, colorants, and combinations thereof. In some embodiments, the dissolvable composition includes a cannabis product such as THC, CBD, and combinations thereof.

The dissolvable composition may include additional components to alter the properties of the composition. Such properties may include the following: structural support of the dissolvable composition; release control of an active ingredient, such as a supplement from the dissolvable composition as it dissolves and/or disperses; shelf stability of the active ingredient; manipulation of the dissolvable composition during manufacture; appearance of the dissolvable composition; and taste of the dissolvable composition.

For instance, the dissolvable composition may be configured such that the dissolution or dispersion of the active or supplement within the dissolvable composition may be released over a period of time. For instance, additional components such as starches may be mixed with polyvinyl alcohol and into one of the materials for generating the supplement such as carrageenan, xanthum gum, guar gum, etc. The period of dissolution or dispersion may be adjusted based on the amount of starch, such as a slower period of dissolution or dispersion when more starch is used and quicker dissolution or dispersion when less starch is used (or vice versa). In some instances a binder may be added to the dissolvable composition to maintain the structural integrity of the substances therein.

Other additional components can include one or more of polymers, defoamers, flow aides, flavor enhancers, rheological modifiers, humectants, waxes, and the like and other components that are utilized to print a layer from an ink, such as dyes, pigments, etc. In some embodiments, the dissolvable composition may include sodium alginate, pectin, and/or polysaccharides. Exemplary polymers may be water soluble, water swellable or water insoluble. They may include but are not limited by, ethyl cellulose, polyacrylic acid, methyl cellulose, polyethylene oxide, guar gum, xanthum gum, gum Arabic, polyvinyl alcohol, sodium alginate, water-soluble hydroxypropylmethyl cellulose, hydroxyethyl cellulose, hydroxypropyl cellulose, polyvinyl pyrrolidone, carboxymethyl cellulose, sodium carboxy methyl cellulose, methyl cellulose, polyvinyl alcohol, xanthum gum, various starches such as corn starch, rice starch etc. Defoamers may include, but are not limited thereto, alcohol or polysiloxane type defoamers both in water and alcohol. Flow aids may contain food grade glycols and polyglycols, xylitol, glycerol. Waxes may include, but are not limited thereto, paraffin or carnauba waxes. Humectants may include, but are not limited thereto, all molecular weight polyethylene glycols and propylene glycols, xylitol, glycerol sugars and starches. Rheology modifiers may include, but are not limited thereto, sodium salts of an acrylic polymer, various starches and gums. Colorants may also be used to tint dissolvable compositions specific colors. In this regard, each layer may include its own color or the same color. Flavorants may be used to impart a flavor to the dissolvable compositions, which may add a particular taste or smell to the dissolvable composition.

Each layer can be tailored to the particular needs of an application. For example, a layer that is self-supporting (e.g. as shown in FIG. 1) may include, in addition to one or more supplements, components such as a high Tg PVOH or PVA and/or a wax and/or a starch that is stiff but which will dissolve quickly upon contact with a predetermined amount of moisture, such as upon contact with a liquid or other solvent.

The active ingredients may include supplements and the supplements may include those suitable for nutrition, flavor enhancement, and/or medicinal purposes that can be ingested. Nutritional supplements can include a vitamin, a mineral, a protein, a probiotic, a fiber, an amino acid, and other dietary supplements. For example, vitamins may include any suitable vitamin that can be ingested, such as vitamin A, B, C, D, E, B12, and the like found in a typical over the counter multivitamin. Minerals may include iron, magnesium, potassium, and the like found in a typical over the counter multivitamin. A protein may include whey protein or a plant based protein. In some instances, the active and inactive ingredients may include pharmaceuticals, as well as beverage and food items. A cannabis product may include THC, CBD, other cannabinoids and the like.

In order to incorporate the active ingredients into the dissolvable composition, the active ingredients may be microencapsulated, dispersed, suspended and/or solubilized into a composition, such as carrageenan, xanthan gum, guar gum, or other such material. In some instances, a small amount of preservative, such as ascorbic acid may be included in the composition. In other embodiments, flavorants, terpenes and/or other resins may be added to the dissolvable composition to provide a desired aroma and/or flavor. In some embodiments, the dissolvable composition includes powdered dextrins, glycerin, emulsifiers, hygroscopic materials, and the like.

In the preceding exemplary embodiments, each layer of the respective dissolvable composition may be sufficiently robust in terms of shelf stability and/or mechanical stability such that the layers do not require a support substrate to improve or provide these properties. In other words, layers comprised of films having sufficient rigidity and/or additional components may obviate the need for a support substrate. For example, a supplement and/or additional component in the layer that has a high Tg can allow for a more rigid active layer which has sufficient stiffness to handle and/or orally ingest and/or place in a food product, such as a beverage, without sagging to a degree that makes handling difficult.

Although the support structures of the above embodiments are shown as fully encompassing one or more layers, a layer may be deposited or otherwise positioned on support substrate, or vice-versa. As such, only a portion or portions of a layer may be disposed on a support structure. See, for example, dissolvable composition 200A, 200B, 200C of FIGS. 2A, 2B, and 2C. Further, a layer (e.g. first layer 210A, 210B, or 210C or second layers 220A, 220B, or 220C) may be encompassed or disposed on more than one support substrate (e.g. substrate 230A, 230B, 230C). In some embodiments, a second substrate may be added to sandwich the dissolvable composition between the substrates. In this instance, the dissolvable composition may be disposed between support substrates, i.e., one support substrate atop active layer, and another support substrate below the layer.

In some embodiments, the substrate may include polyester or release paper made from a variety of sources known to those in the art. For example, the substrate may include parchment paper or polyester. In some embodiments, the substrate may be any type of paper known to those of skill in the art with a release coating applied to the surface of the paper, such as silicone, Teflon, stearic acid, and the like, or any substance capable of acting as a barrier to ensure the dissolvable composition does not dissolve into the surface of the paper. In some embodiments, the substrate is edible, such as rice paper, sugar paper, and the like. In embodiments when an edible substrate is utilized, the substrate may also dissolve when associated with the solvent.

The dissolvable composition may be arranged in various dispensing configurations. For example, one dispensing configuration may be a continuous tape with or without perforations for tearing. In some instances the continuous tape arrangement of the dissolvable composition may be placed in a tape dispenser type device, where a portion of the strip may be torn off with the assistance of a cutting blade. In the continuous tape arrangement, a support substrate, such as release paper may support and or enclose one or more active layers. In some embodiments, the dissolvable composition is associated with a fabric, polymer, or resin.

In another exemplary embodiment, the dissolvable composition may be printed on a release paper. The dissolvable composition may be removed from the release paper after manufacturing or prior to use by the consumer. In instances where the dissolvable composition is formed on a support substrate, no release paper may be required. Rather, the dissolvable composition may be stored in a dispenser such as stacking the dissolvable compositions on top of each other, such as similar to Pez from a Pez dispenser, packaging the dissolvable composition in a pouch or sealed packaging, such as like an individual Band-Aid, packaging the dissolvable composition in a dispenser, similar to those used to dispense Listerine Strips, see for example U.S. Publication No. 2003/0121932, or each dissolvable composition may be packaged in a sealed childproof package, which may include foil, plastic, and the like. Packaging for dispensing may also be printed and/or individualized, for example, with a person's name, corporate logo, celebratory message, and the like.

In some embodiments, a support substrate may allow for multiple dosages (e.g., portioned layer(s) of active ingredients,) to be attached to one sheet of a support substrate to carry multiple dosages on one sheet instead of individual dosages that are packed loose. See, for example, FIG. 2C.

The dissolvable composition and components thereof, such as each layer and support substrate, can be any shape suitable for a desired application. For example, the dissolvable composition can be in the form of a rectangular strip, a cube, a sphere, a disk, oval, stars, snowflakes, decorative designs, and the like. The dissolvable composition can have multiple layers where one or more of the layers are different shapes. For example, a round support substrate may have one or more strip shaped active layers disposed thereon. For example, the shapes of the dissolvable composition may be tailored to meet a particular design need, such as a shape of the item that the dissolvable composition will be included in, or to achieve a desired release profile. In some instances, multiple layers of one or more of the same supplements may be used to increase the dosage of a single dissolvable composition.

The dissolvable composition may be used in various applications. In some embodiments, the dissolvable composition of the present invention dissolves based on the solvent to which it is associated. The dissolvable compositions of the present invention may be associated with any solvent capable of dissolving the composition. In some embodiments, the solvent may be selected from a solid, liquid or a gas. In some embodiments, the dissolvable composition may convey a message when associated with a solid, such as an ice cube or dry ice. In other embodiments, the dissolvable composition may convey a message when associated with a liquid, such as a beverage, or a large body of water, such as a pool.

Figure 3B:
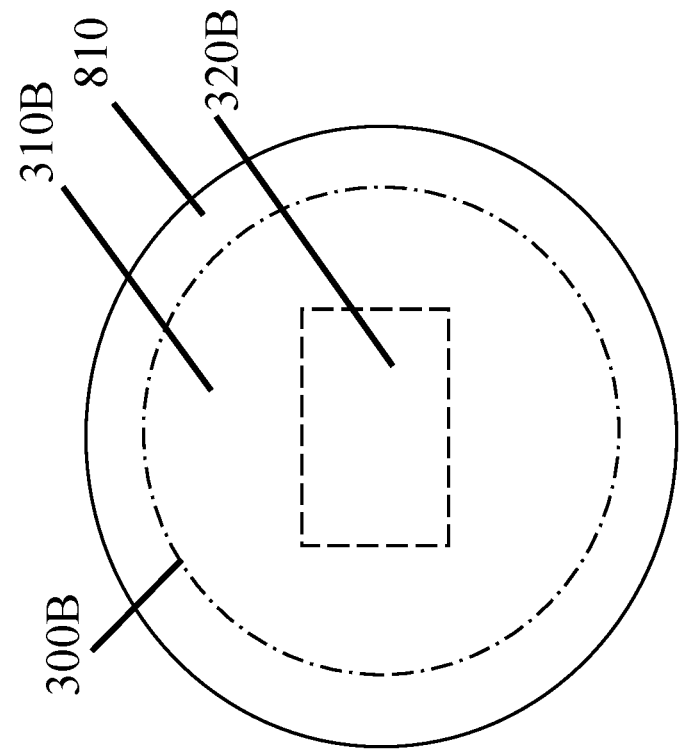
FIGS. 3A and 3B depict a schematic view of a solvent including a dissolvable composition in accordance with some embodiments of the present invention.
Figure 3A:
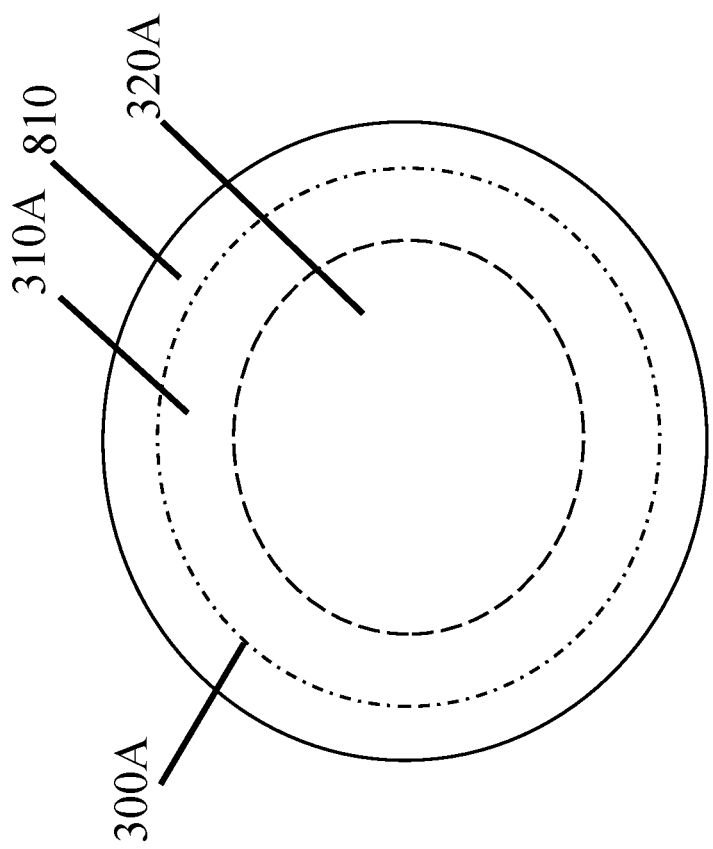

In some aspects, dissolvable composition 300A and 300B may be associated with solvent 810, as shown in FIGS. 3A and 3B. Once associated with solvent 810, first dissolvable layer 310A or 310B may dissolve first and convey a message via second dissolvable layer 320A or 320B. In some embodiments, second dissolvable layer 320A or 320B may dissolve first and convey a message via first dissolvable layer 310A or 310B.

In some aspects, the indicia conveys a message when associated with a solvent. See FIGS. 4A and 4B. In some embodiments, dissolvable layer 420A of dissolvable composition 400A may dissolve first, leaving an outline of the indica of dissolvable layer 420A through dissolvable layer 410A in solvent 810. For example, the dissolvable composition may say "Happy Birthday" or "Good Luck." In some aspects, the indica conveys a corporate logo.

Figure 5:
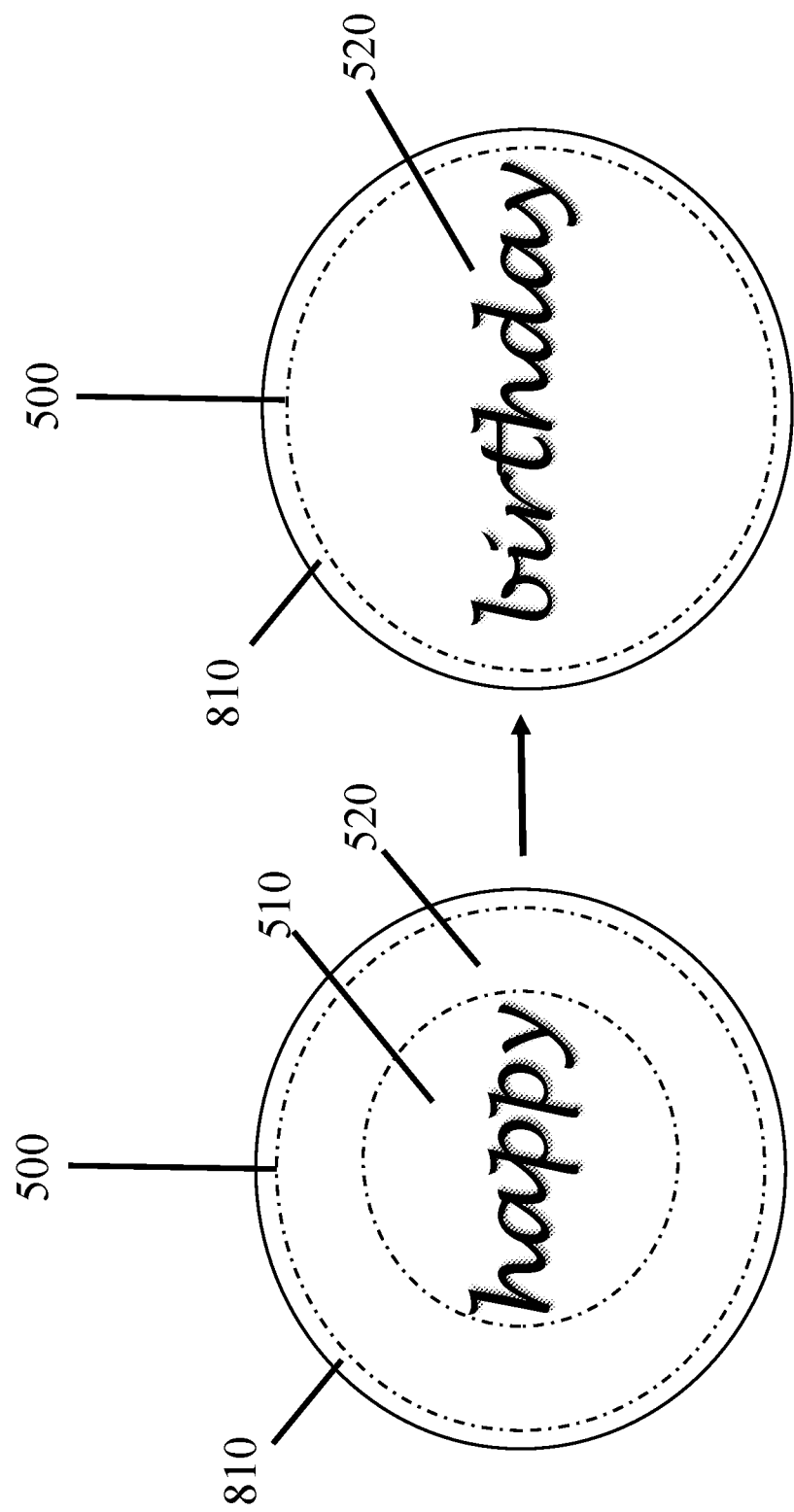
FIG. 5 depicts a schematic view of a solvent including a dissolvable composition in accordance with some embodiments of the present invention.

In some aspects, the dissolvable composition can include more than one layer having indicia. In some aspects, the dissolvable composition may include more than one layer that includes indicia. In these aspects, one layer that includes indicia may dissolve first and convey a message. Once the first message is dissolved, the next layer may convey a separate message. For example, the first message may convey "Happy Birthday!" and the second conveys "I love you!" See dissolvable composition 500 and solvent 810 of FIG. 5. First dissolvable layer 510 provides indicia when associated with a solvent. The indicia of second dissolvable layer 520 cannot be seen until first dissolvable layer 510 is fully dissolved. The dissolution rate of each layer of dissolvable compositions may be controlled. For example, the dissolvable composition may be tailored to have individual time release profiles, where each layer provides a different release profile. The first dissolvable layer may provide a first indica within 3 seconds of being exposed to a solvent and this lasts for 3 seconds to 1 minute. Once the first dissolvable layer completely dissolves, the second dissolvable layer conveys a second indicia. See FIG. 5. First dissolvable layer 510 conveys the message "happy" and second dissolvable layer 520 conveys the message "birthday." The message of second dissolvable layer 520 is not shown until first dissolvable layer 510 dissolves.

In one aspect, dissolvable composition may have a dissolution rate in the range of about 1 second to about 12 hours. In one aspect, the dissolvable composition may have a dissolution rate of about 1 second to about 12 hours when associated with a solvent having a temperature of between about 0° F. to about 220° F. In one aspect, the dissolvable composition may have a dissolution rate of about 1 second to about 30 minutes when associated with a solvent having a temperature of between 30° F.-50° F. In another aspect, the dissolvable composition may have a dissolution rate of about 1 second to about 30 minutes when associated with a solvent having a temperature of between 60° F.-85° F. In yet another aspect, the dissolvable composition may have a dissolution rate of about 1 second to about 30 minutes when associated with a solvent having a temperature of between 160° F.-200° F.

In one aspect, one layer of the dissolvable composition may have a dissolution rate of about 1 second to about 30 minutes when associated with a solvent having a temperature of between about 0° F. to about 220° F. An adjacent layer may have a dissolution rate of 31 seconds to about 60 minutes when the solvent has a temperature between about 0° F. to about 220° F.

In some embodiments, the dissolution rate may vary based on the type solvent used to dissolve the dissolvable composition. For example, if the solvent is a liquid that includes a salt, the dissolution rate of the dissolvable composition may be slower than if the dissolvable composition was placed in distilled water. In another example, if the solvent is a liquid that includes a sugar, the dissolution rate of the dissolvable composition may be quicker than if the dissolvable composition was placed in a liquid that included salt. In some embodiments, the dissolution rate of the dissolvable composition may be adjusted to a rate that is at least 5% slower than another dissolvable composition or cause the dissolvable composition to have a slow dissolution rate of at least one hour. For example, if the dissolvable composition includes citric acid and the dissolvable composition is introduced into a liquid composition that includes Epsom salt, the dissolvable composition may remain on the surface of the liquid composition until it is completely dissolved. In other words, the dissolvable composition will not settle out of the solution and form sediment at the bottom of the liquid composition.

Figure 6:
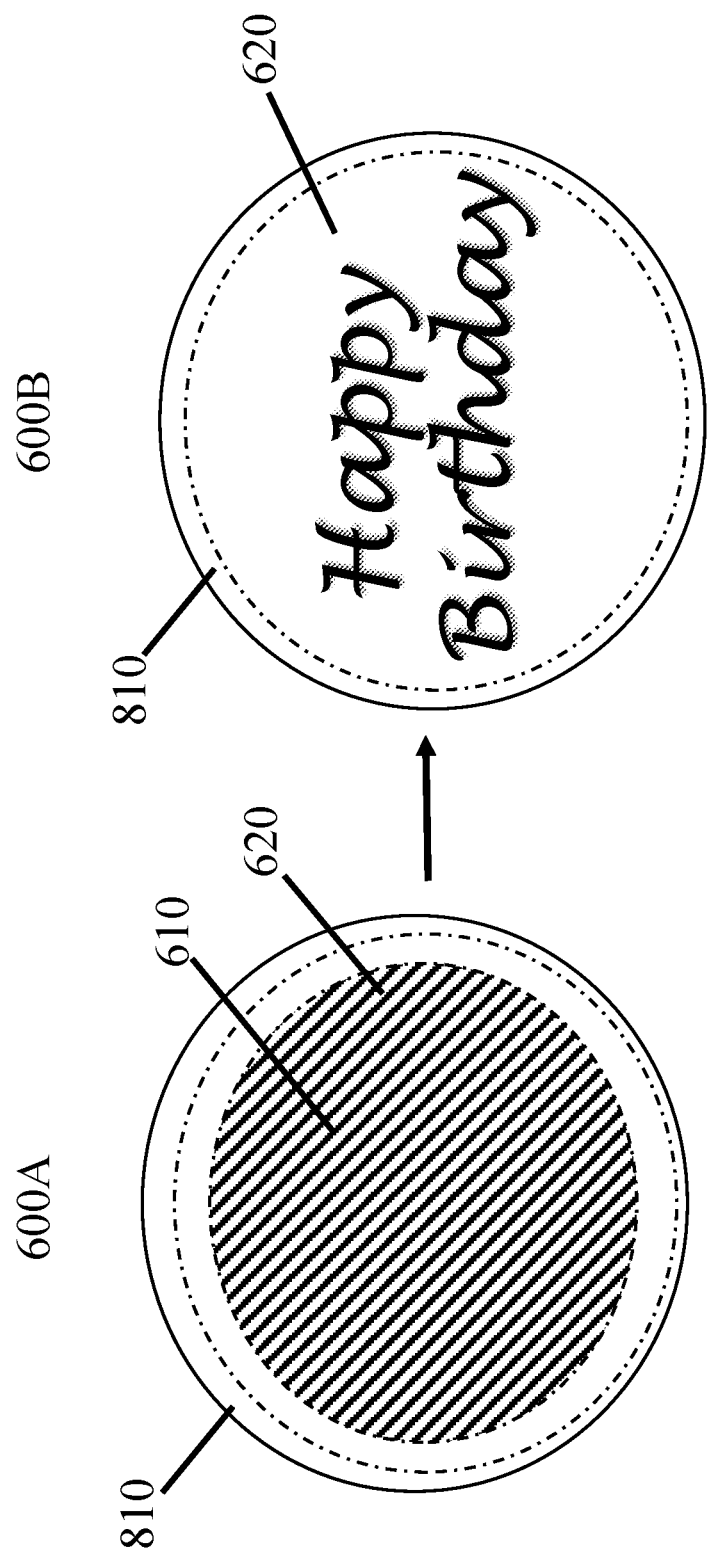
FIG. 6 depicts a schematic view of a solvent including a dissolvable composition in accordance with some embodiments of the present invention.

In some embodiments, one dissolvable layer may mask or camouflage an indicia layer, which is only exposed after the first layer is completely dissolved. See FIG. 6. First dissolvable layer 610 masks the indicia or message of the dissolvable layer 620 when first associated with solvent 810. The indicia of second dissolvable layer 620 cannot be seen until first dissolvable layer 610 is fully dissolved by solvent 810.

As will be understood by persons of skill in the art, the dissolvable composition can vary in dimensions. Such variation in size may be dependent on application. In some embodiments, an individual layer may range in length or diameter from about 1 mm×1 mm to about 12 inches by 12 inches. In some embodiments, the dissolvable composition may be in the shape of a circle, a rectangle, a triangle, a square, and the like. In some embodiments, the dissolvable composition may be 0.5 inches to 3 inches in diameter. In some embodiments, the dissolvable composition is 1 inch to 2 inches in diameter. Larger lengths or diameters are possible, for example, such as when the dissolvable composition are utilized for large scale process such as mass production of food products or beverages. For instance, larger sizes for dissolvable composition may be utilized in large tea makers or large industrial coffee makers. These dissolvable compositions may range in size from 1 inch by 1 inch to 6 feet by 6 feet. In some embodiments, the large scale dissolvable compositions may be between 8 inches in length to 15 inches in width to 15 inches in length and 8 inches in width. In some embodiments, the large scale dissolvable composition may be 6 feet in length by 4 feet in width.

In some embodiments, an individual layer may range in thickness from about 2 microns to about 20 millimeters, but greater than 20 millimeters is also contemplated. In some embodiments, the dissolvable layers may have a thickness of between 5-100 microns. In some embodiments, the dissolvable composition may have a thickness between 10 microns and 10 millimeters.

In some embodiments, the dissolvable composition may only include one layer. The single layer may include regions of varying thickness. In some embodiments, the thicker region of the layer may include indicia. In other embodiments, the thinner region of the layer may include indicia. When the dissolvable composition having a single layer is associated with a solvent, the thinner region(s) will dissolve faster than the thicker region(s). The indicia provided may be the absence of a region, i.e. the thinner portion containing the indicia dissolved first. In other embodiments, the indicia may be the only portion of the dissolvable composition remaining after the other region(s) of the dissolvable composition dissolved, i.e. the indicia is located in a thicker region of the dissolvable composition.

The dissolvable composition can be made using any number of techniques. In some embodiments, the dissolvable composition is made using printing techniques, for example, such as rotary screening printing, flat screening printing, flexography, offset gravure, ink jet, bubble jet, dry toner, ribbon transfer, powder coating, spraying coating, roll coating, reverse roll coating, slot die coating, hot and/or cold laminating, knife coating, sintering, padding, curtain coating, and the like. In this regard, printing techniques are understood to cover coating techniques.

In some embodiments, a printing method using an ink, such as inks described herein, may be utilized to make the one or more layers of printed dissolvable compositions. The ink may be aqueous or solvent based. As previously described, the ink may be ultraviolet (UV) curable, electron beam (EB) curable, thermally curable, cold curable, ambient or evaporation, ambient catalyzed, ambient crosslinked, and the like. The ink may be edible and/or dissolvable based on the desired application. The ink may include the various components of the active layer, support substrate, and barrier layer discussed herein.

Figure 7:
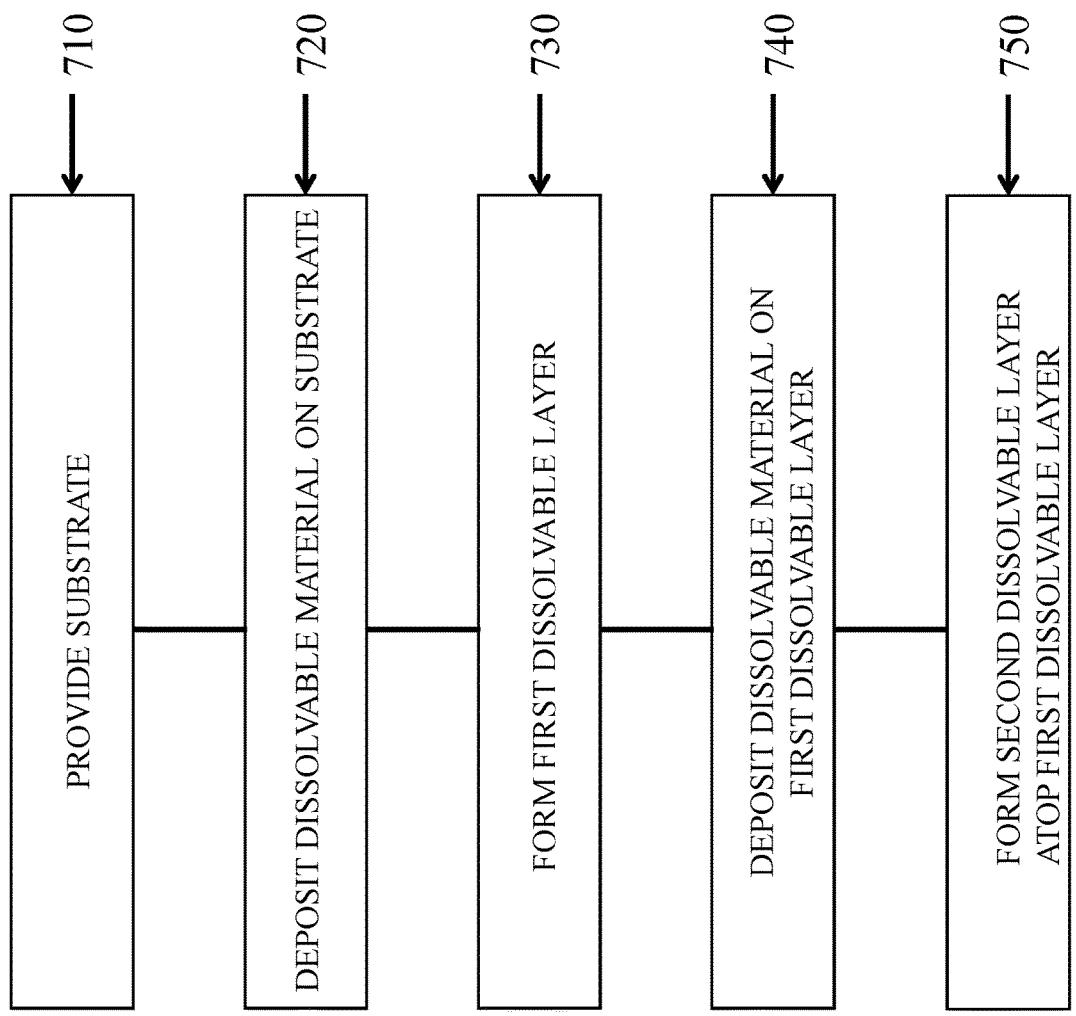
FIG. 7 depicts a flow chart for a method of making a dissolvable composition in accordance with some embodiment of the present invention.

The method may vary depending on the type of dissolvable composition being made. The method 700 is described in FIG. 7. At 710, a substrate (e.g. 230A) is provided. At 720, the dissolvable material is deposited on the substrate. At 730, the first dissolvable layer (e.g. 210A) is then formed on a support substrate, such as those described herein. At 740, dissolvable material is deposited atop the first layer. At 750, the second dissolvable layer (e.g. 220A) is formed atop the first dissolvable layer. Optionally, additional layers, such as active layers or support substrates, may be added atop the second layer to achieve a desired dissolvable composition.

In an example process of forming a dissolvable composition, the liquid that produces the dissolvable composition is produced according to standard practices known to those in the art, including other slurry or printing ink methods. For example, if the composition is produced via a screen printing method, the resulting dissolvable composition may have a higher viscosity, i.e. greater than 10,000 cps. In some embodiments, the liquid or "ink" is placed in a flat screen or stencil and the ink is squeegeed across the stencil or screen onto a release paper or polyester. The ink goes through the open areas of the screen or stencil onto the release substrate to leave a particular pattern that is then heat dried or air dried. Once the product is dry to the touch, the substrate that carries the print can be cut and packaged or the product can be removed from the release sheet so it can be handled as a self-supporting product with no other carrier or support structure needed and then packaged.

The dissolvable composition may also be prepared by flexo printing, stenciled, casted, screen printing, heavy deposition, and the like. In flexo printing, the liquid or ink composition utilized may have a viscosity less than 10,000 cps. Flexo may include two methods, flexo which uses an anilox roller to carry a certain amount of ink that comes in contact with a plate and is transferred onto the substrate. This is usually for low deposition materials, where the materials may have a lower viscosity. Also on a flexo press, instead of an anilox roller, the compositions can be printed through a rotary screen to deposit heavier amounts of ink onto the substrate, where the materials may have a higher viscosity, i.e. between 10,000 cps to about 100,000 cps. This would be used for larger amounts of active ingredients to be deposited, which would yield a thicker and heavier dissolvable composition.

The dissolution profile of the individual layers can be modified according to the intended use. In some embodiments, the first layer may be designed to dissolve in about 3 seconds to about 15 seconds while the second layer may be designed to dissolve in about 20 seconds to about 2 minutes. In other aspects, the second layer may be designed to dissolve in 3 seconds to about 15 seconds while the first layer may be designed to dissolve in about 20 seconds to about 2 minutes.

The dissolution profiles may vary based on the temperature of the solvent. For example, if the dissolvable composition is to be placed in a hot beverage, the first layer may dissolve in 3 seconds to about 30 minutes while the second layer may be designed to dissolve in about 20 seconds to about 1 hour or the second layer may be designed to dissolve in 3 seconds to about 30 minutes while the first layer may be designed to dissolve in about 20 seconds to about 1 hour. If the dissolvable composition is to be placed in a cold beverage, the first layer may dissolve in 3 seconds to about 30 minutes while the second layer may be designed to dissolve in about 20 seconds to about 1 hour or the second layer may be designed to dissolve in 3 seconds to about 30 minutes while the first layer may be designed to dissolve in about 20 seconds to about 1 hour. In some embodiments, one layer may dissolve in 3 seconds to about 15 minutes while the other layer may dissolve in about 20 seconds to about 30 minutes. In some embodiments, one layer may dissolve in 3 seconds to about 5 minutes while the other layer may dissolve in about 20 seconds to about 15 minutes. In some embodiments, one layer may dissolve in 3 seconds to about 2 minutes while the other layer may dissolve in about 20 seconds to about 5 minutes. If the dissolvable composition is to be placed in a larger body of liquid, such as, for example, a pool or lake, the first layer may dissolve in 3 seconds to about 30 minutes while the second layer may be designed to dissolve in about 20 seconds to about 12 hours or the second layer may be designed to dissolve in 3 seconds to about 15 seconds while the first layer may be designed to dissolve in about 20 seconds to about 2 minutes.

The dissolution profile for the dissolvable composition may be manipulated or controlled based on the composition of the intended solvent or temperature of the intended solvent to which the dissolvable composition is to be associated. For example, in some embodiments, the dissolvable composition is formulated for dissolution on an ice cube or on dry ice. In some embodiments, the dissolvable composition is formulated for dissolution in a hot or cold beverage. In some embodiments, the dissolvable composition is formulated for dissolution in a pool or lake.

In some embodiments, the dissolution rate of the dissolvable composition is controlled by the solubility of the dried film, thickness of the dried film, turbidity of the solvent, constituents of the solvent, thickness of the solvent, the size ratio of the dissolvable composition to the inside diameter of the vessel that contains the solvent that the dissolvable composition is dissolving into, and how the dissolvable composition is actually associated with the solvent. For example, if the dissolvable composition is dropped gently on the surface of a liquid it will dissolve according to that listed above. However, if the dissolvable composition is placed in the vessel in a manner that part of the dissolvable composition is submerged and not laid properly on the surface, the dissolution rates may vary.

EXAMPLES

In one embodiment of the present invention, the dissolvable composition was prepared according to a method of the present invention. The dissolvable ink was prepared to have certain soluble and dispersible ingredients. The first dissolvable layer was printed through a 125 mesh or about 10 microns of dried film. The second layer was printed on top of the first layer so that the total deposition in that second layer design was double that of the first layer. This allowed for the first layer to dissolve quicker than the combination of the first and second layer in the design area.

It will be understood by those skilled in the art that, although the subject invention has been described above in relation to embodiments thereof variations and modifications can be effected in these preferred embodiments without departing from the scope and spirit of the invention.

Unless otherwise stated, the foregoing, alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:
1. A dissolvable composition comprising:
a first layer having a first dissolution rate; and
an indicia layer having a second dissolution rate,
  wherein the indicia layer is associated with the first layer and
  comprises indicia formed of an ink,
  wherein the first dissolution rate is from 3 seconds to 15 seconds and is faster than the second dissolution rate, and
  wherein the dissolvable composition is in sheet form.
2. The composition of claim 1, wherein the indicia layer has a dissolution rate of 20 seconds to 60 minutes.
3. The composition of claim 1, wherein the indicia layer has a dissolution rate of 20 seconds to 2 minutes.

4. The composition of claim 1, wherein the dissolvable composition comprises an active ingredient.

5. The composition of claim 4, wherein the active is selected from the group consisting of: vitamins, minerals, proteins, probiotics, fibers, amino acids, dietary supplements, pharmaceutical ingredients, nutritional supplements, and combinations thereof.

6. The composition of claim 1, wherein the dissolvable composition comprises a cannabis product.

7. A dissolvable printed composition comprising:
 a first printed layer having a first dissolution rate; and
 a second printed layer comprising indicia formed of an ink and having a second dissolution rate,
 wherein the first printed layer is associated with the second printed layer
 wherein the first dissolution rate is from 3 seconds to 15 seconds and is faster than the second dissolution rate, and
 wherein the dissolvable composition is in sheet form.

8. The composition of claim 7, wherein the second printed layer has a dissolution rate of 20 seconds to 60 minutes.

9. The composition of claim 7, wherein the second dissolution rate is from 20 seconds to 2 minutes.

10. A method for preparing a dissolvable composition, comprising:
 printing a first dissolvable layer having a first dissolution rate;
 printing a second dissolvable layer on the first dissolvable layer, wherein the second dissolvable layer comprises indicia and has a second dissolution rate,
 wherein the dissolvable composition is capable of displaying indicia in a beverage wherein the first dissolution rate is from 3 seconds to 15 seconds.

11. The method of claim 10, wherein the first dissolvable layer dissolves at a faster rate when exposed to a solvent than the second dissolvable layer.

12. A dissolvable composition comprising a dissolvable layer, wherein the layer comprises a plurality of regions having varying thickness, wherein the dissolvable layer comprises a thicker region comprising indicia,
 wherein the indicia of the thicker region dissolves at a slower rate than an adjacent thinner region of the layer,
 wherein the dissolvable composition is in sheet form, wherein the thinner region dissolves at a rate from 3 seconds to 15 seconds.

* * * * *